(12) United States Patent
Antipa et al.

(10) Patent No.: US 10,484,175 B2
(45) Date of Patent: Nov. 19, 2019

(54) AUTHENTICATING A MOBILE DEVICE TO A DIGITAL SIGNAGE DEVICE

(71) Applicant: Adobe Inc., San Jose, CA (US)

(72) Inventors: Damien M. Antipa, Basel (CH); Antonio Sanso, Duggingen (CH)

(73) Assignee: Adobe Inc., San Jose, CA (US)

( * ) Notice: Subject to any disclaimer, the term of this patent is extended or adjusted under 35 U.S.C. 154(b) by 259 days.

(21) Appl. No.: 15/650,100

(22) Filed: Jul. 14, 2017

(65) Prior Publication Data

US 2019/0020479 A1    Jan. 17, 2019

(51) Int. Cl.
| | |
|---|---|
| G06F 7/04 | (2006.01) |
| H04L 9/32 | (2006.01) |
| G06F 21/44 | (2013.01) |
| H04L 29/06 | (2006.01) |
| H04W 12/08 | (2009.01) |
| H04L 9/30 | (2006.01) |
| H04W 12/06 | (2009.01) |
| G06Q 30/02 | (2012.01) |

(52) U.S. Cl.
CPC ............ H04L 9/3213 (2013.01); G06F 21/44 (2013.01); H04L 9/302 (2013.01); H04L 9/3215 (2013.01); H04L 9/3221 (2013.01); H04L 9/3228 (2013.01); H04L 9/3271 (2013.01); H04L 63/062 (2013.01); H04L 63/0807 (2013.01); H04L 63/0838 (2013.01); H04L 63/0884 (2013.01); H04W 12/06 (2013.01); H04W 12/08 (2013.01); G06Q 30/0267 (2013.01); H04L 63/0442 (2013.01)

(58) Field of Classification Search
CPC ............... H04L 9/3213; H04L 63/0807; H04L 63/0884; H04L 63/0838; H04L 9/3215; H04L 9/3271; H04L 9/3228; H04L 9/3221; H04L 9/302; H04L 63/062; H04L 63/0442; H04W 12/06; H04W 12/08; G06F 21/44; G06Q 30/0267
USPC .......................................................... 713/10
See application file for complete search history.

(56) References Cited

U.S. PATENT DOCUMENTS

| | | | | |
|---|---|---|---|---|
| 8,769,627 | B1 * | 7/2014 | Guo | G06F 11/1453 726/4 |
| 2015/0134966 | A1 * | 5/2015 | Wallrabenstein | H04L 63/0853 713/174 |
| 2016/0344752 | A1 * | 11/2016 | Sterne | H04L 63/1416 |

OTHER PUBLICATIONS

Flood,"Securing the Internet of Things: A ZKP-based Approach", Sep. 31, 2014, 26 pages.

* cited by examiner

*Primary Examiner* — Mohammad W Reza
(74) *Attorney, Agent, or Firm* — SBMC

(57) ABSTRACT

A digital medium environment includes a computing device (e.g., a mobile device), a digital signage device, and a server. The computing device is coupled to the digital signage device via a first communication channel, e.g., according to a low emissions protocol. The digital signage device is coupled to the server via a second communication channel that is encrypted. Security is achieved using a one-time-use token and a resolution provided by the computing device that proves the computing device knows a factorization, known to both the digital signage device and the server, without exposing the factorization in the resolution. The token is communicated from the server to the digital signage device, and is not exposed to the computing device. Thus, the authentication techniques described herein are robust and secure to an attack of communication between the computing device and the digital signage device, and are seamless to the user.

20 Claims, 6 Drawing Sheets

AUTHENTICATING A MOBILE DEVICE TO A DIGITAL SIGNAGE DEVICE

BACKGROUND

Digital signage devices, such as kiosks with display screens, are used in retail shops to display information for customers. For instance, a digital signage device may display advertisements at a grocery store for items that are on sale. In some cases, a user computing device, such as a mobile phone, tablet, or watch, can interact with the digital signage device. Continuing the grocery store example, a grocer may wish to provide targeted advertisements to specific customers on a digital signage device displayed in the grocery store. However, for privacy reasons, targeted data, including user data, cannot usually be displayed on the digital signage device without first authenticating the mobile device to the digital signage device.

Authentication of a user computing device to a digital signage device is often done with a quick response (QR) code. For example, a user may scan a displayed QR code, take a picture of a QR code, or open a QR code to authenticate the user computing device to the digital signage device. However, QR codes require user interaction that is cumbersome, and prohibitive to some users. Furthermore, login forms are sometimes used to authenticate a user computing device, but are cumbersome and time consuming to fill out, and for privacy reasons should not be filled out in public.

Other solutions to authenticate a user computing device to a digital signage device broadcast a beacon (e.g., from the digital signage device) to the user computing devices. The beacon includes an identifier that is shared between different user computing devices. Therefore, though adequate for general data (e.g., generic advertisements), beacon broadcasting does not meet security requirements for user-specific data. Consequently, existing methods of authenticating a user computing device to a digital signage device are too cumbersome and/or insecure, and are thus not suitable to many applications where sensitive or private user data is exposed to the digital signage device.

SUMMARY

Techniques and systems are described to authenticate a user computing device (e.g., a mobile device) to a digital signage device. In response to an authentication request from the user computing device to authenticate with the digital signage device (e.g., to log into and expose user data to the digital signage device), the digital signage device communicates the authentication request to a server. The server issues a challenge, including a random number and a one-time-use token. The digital signage device maintains the token, and forwards the challenge including the random number, but not including the token, to the user computing device. The user computing device performs a calculation based on the random number and a factorization (e.g., two prime factors) to produce a resolution. The factorization is known to the user computing device and the server (e.g., associated with a username in the authentication request from the user computing device), and the resolution is constructed in such a way to prove the user computing device knows the factorization, without exposing the factorization in the resolution, such as according to a zero knowledge proof (ZKP) construction. The digital signage device receives the resolution from the user computing device, and sends it together with the token to the server. The server authenticates the user computing device using the token, the resolution, and a copy of the factorization stored at, or accessible by, the server.

An application on the user computing device can automatically send the authentication request, such as when the user computing device is proximate the digital signage device. Hence, authentication of the user computing device to the digital signage device can be done seamlessly to the user, in contrast to cumbersome QR codes. Furthermore, the methods described herein are secure, because the token is a one-time-use token, which expires after the one-time-use. The token is not exposed to the user computing device, and the factorization is not exposed in the resolution sent from the user computing device. Hence, communication between the user computing device and the digital signage device is secure to a man-in-the-middle attack, where a non-authorized user who does not know the factorization may record and re-transmit communications between the user computing device and the digital signage device in an attempt to guess or learn the factorization.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items. Entities represented in the figures may be indicative of one or more entities and thus reference may be made interchangeably to single or plural forms of the entities in the discussion.

DETAILED DESCRIPTION

Overview

Figure 1:
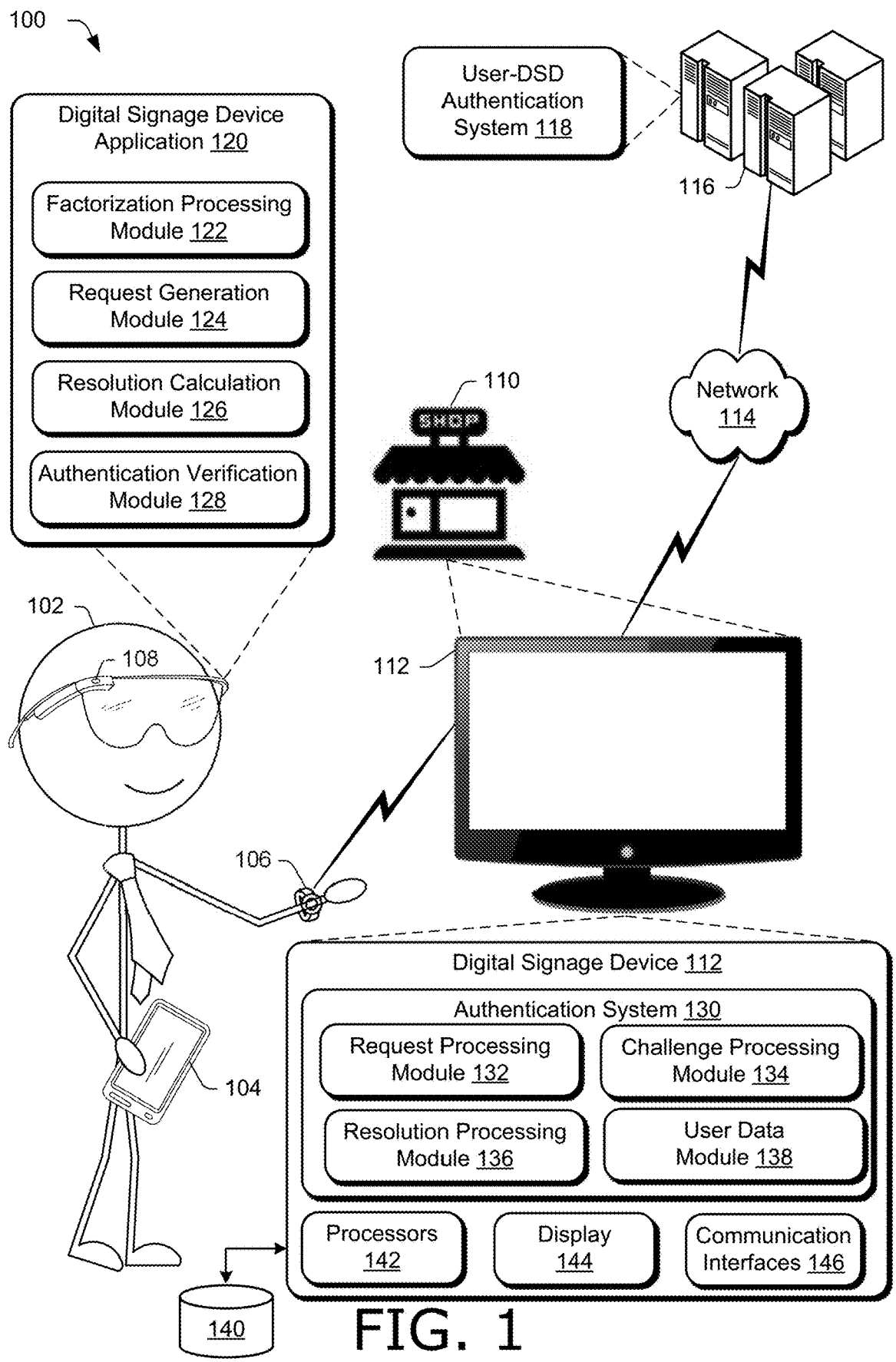
FIG. 1 is an illustration of a digital medium environment in an example implementation that is operable to employ techniques described herein.

Digital signage devices, such as kiosks with display screens, are used in retail shops to display information for customers. For instance, a digital signage device may display advertisements at a grocery store for items that are on sale, or videos of automobiles at an automobile dealer. In some situations, it is desirable for a user to interact with the digital signage device and expose user data to the digital signage device. In one example, a user works from a mobile device (e.g., a tablet at the user's home) to configure a new automobile the user wishes to purchase, such as selecting wheel options, paint scheme, graphics design, trim package, exhaust routing, window tinting, etc., and stores configuration information for the automobile on the mobile device and/or a remote server. The user may then go to the automobile dealer and wish to interact with a digital signage device at the automobile dealer by exposing the configuration information to the digital signage device, such as displaying an automobile configured according to the configuration information on the digital signage device to discuss with the automobile dealer.

Therefore, privacy and security in some situations require that a user computing device (e.g., a user's mobile device) be authenticated to the digital signage device before exposing user data on or with the digital signage device, or allowing the user to log into the digital signage device with the user computing device. Authentication is done to prove that the mobile device is the true mobile device, such as corresponding to a username associated with the true mobile device, and not a fraud impersonating the true mobile device.

Authentication of a user computing device to a digital signage device is often done with a quick response (QR) code, such as by scanning or imaging the QR code with the user computing device. However, QR codes require user interaction and are cumbersome to use for many users, and thus are not well accepted by end users. Login forms are sometimes used to authenticate a user computing device, but are cumbersome and time consuming to fill out, and for security reasons should not be filled out in public. Furthermore, some solutions to authenticate a user computing device to a digital signage device broadcast a beacon (e.g., from the digital signage device) to user computing devices. The beacon includes an identifier that is shared between different user computing devices. Therefore, though adequate for general data (e.g., generic advertisements), beacon broadcasting does not meet security requirements for user-specific data. Consequently, existing methods of authenticating a user computing device to a digital signage device are too cumbersome and/or insecure, and are thus not suitable to many applications where sensitive or private user data is exposed to the digital signage device.

Accordingly, this disclosure describes systems and techniques for authenticating a user computing device to a digital signage device that are seamless to the user and secure. Security is achieved using a one-time-use token and a resolution provided by the user computing device that proves the user computing device knows a factorization, known to both the digital signage device and a server communicatively coupled to the digital signage device, without exposing the factorization in the resolution. For instance, the resolution can be generated based on a zero knowledge proof (ZKP) construction, in which knowledge of a fact can be proved without revealing the fact. The token is communicated from the server to the digital signage device, and is not exposed to the user computing device. Thus, the systems and techniques described herein are robust and secure to a man-in-the-middle attack of communication between the user computing device and the digital signage device.

Communication between the user computing device and the digital signage device is done via a first communication channel, such as according to a low emissions protocol (e.g., Bluetooth or Bluetooth Low Emissions (BLE)). A digital signage device application installed on the user computing device can automatically send a request for authentication (e.g., an authentication request) via the first communication channel to the digital signage device, such as when the user computing device is proximate the digital signage device and pairing between the user computing device and the digital signage device occurs. Thus, authentication of the user computing device to the digital signage device is seamless to the user (e.g., authentication processes of the digital signage device application can run as background processes on the user computing device). The user computing device (e.g., a mobile phone or tablet) may or may not be directly connected to a network, such as the Internet, cellular network, Wi-Fi network, and the like.

In response to receiving the authentication request from the user computing device, the digital signage device communicates the authentication request to the server communicatively coupled to the digital signage device. Communication between the digital signage device and the server is done via a second communication channel, such as according to a protocol using encrypted communications (e.g., hyper text transfer protocol secure, or https). The server receives the request, and in response, issues a challenge, including a random number and a one-time-use token. The digital signage device receives the challenge from the server, maintains the token, and forwards the challenge including the random number, but not including the token, to the user computing device. Thus, the token is not exposed to the first communications channel.

The user computing device performs a calculation based on the random number received from the digital signage device and a factorization to produce a resolution. The factorization is known to the user computing device and the server (e.g., associated with a username in the request from the user computing device). One example of a factorization is two or more prime numbers. The resolution is generated in such a way to prove the user computing device knows the factorization, without exposing the factorization in the resolution. For instance, the resolution can be generated according to a ZKP construction, which generates the resolution by raising a first prime factor to a random number and computing a modulo result with a second prime factor.

The digital signage device receives the resolution from the user computing device, and sends it together with the token to the server. The resolution may contain the username associated with the user computing device. The server authenticates the user computing device using the token, the resolution, and a copy of the factorization stored at, or accessible by, the server. Upon successful authentication, the server provides a verified indicator to the digital signage device, and the digital signage device provides the verified indicator to the user computing device. Once authenticated, the server, the user computing device, or the server and the user computing device can provide user data to the digital signage device, such as for display on the digital signage device. Furthermore, data from the server, such as configuration files, targeted advertisements, and user data, can be provided to the user computing device via the digital signage device, and displayed on the user computing device.

The systems and techniques described herein constitute an improvement over current approaches which primarily authenticate a user computing device to a digital signage device with QR codes, login forms, or broadcast beacons, and thus are cumbersome and/or insecure and require the user's device to have an internet connection. The nature of the described aspects to authenticate a user computing device by generating a resolution that proves the user computing device knows a factorization without exposing the factorization in the resolution, and maintaining a one-time-use token by the digital signage device and not exposing the token to the user computing device, results in seamless and secure authentication of the user computing device to the digital signage device, as discussed below in more detail.

Term Examples

"Asset" describes any piece of content, such as videos, advertisements, audio files, multi-media streams, animations, images, web documents, web pages, applications, device applications, text documents, drawings, presentations, user data, configuration files, user profiles, user preferences, and so forth.

"Authentication request" describes a request generated by a computing device (e.g., a user's mobile device) and sent to a digital signage device by the computing device. The authentication request may include a request to authenticate the computing device to the digital signage device, including a request to log into the digital signage device and expose sensitive/private user data to the digital signage device.

"Challenge" describes one or more structures, such as generated by a server and communicated to a digital signage device, including a random number and a token that can be responded to for authentication.

"Digital signage device" describes any display, screen, projector, signage, and the like that is made available to one or more users proximate to the digital signage device. For instance, a kiosk with a video screen at a retail shop is one example of a digital signage device, and an Internet-enabled monitor at a church event is another example of a digital signage device.

"Resolution" describes a response supplied by a computing device to a challenge issued by a server. The resolution may be generated from calculations of a random number included in the challenge based on a factorization known to the computing device and the server, without exposing the factorization in the resolution. The resolution may be generated according to a zero knowledge proof construction.

"Token" describes a one-time-use token included in the challenge generated by the server. Once used, or executed, the token expires. The token is not exposed to the user's computing device, but instead is sent from the server to the digital signage device and maintained by the digital signage device. When the digital signage device forwards the resolution from the computing device to the server, the digital signage device includes the token. The server authenticates the computing device using the received token and resolution, the random number in the challenge, and the commonly known factorization.

"User data" describes data associated with a user of the computing device wishing to be authenticated with the digital signage device. User data may be sensitive and/or private, and thus unsuitable for display on the digital signage device until the computing device is authenticated.

"Verified indicator" describes an indicator provided by a server to the digital signage device once a computing device is verified.

"Zero knowledge proof (ZKP)" describes a construction in which knowledge of a fact can be proved without revealing the fact.

In the following discussion an example digital medium environment is described that may employ the techniques described herein. Example implementation details and procedures are then described which may be performed in the example digital medium environment as well as other environments. Consequently, performance of the example procedures is not limited to the example environment and the example environment is not limited to performance of the example procedures.

Example Digital Medium Environment

FIG. 1 is an illustration of a digital medium environment 100 in an example implementation that is operable to employ techniques described herein. As used herein, the term "digital medium environment" refers to the various computing devices and resources that can be utilized to implement the techniques described herein. The illustrated digital medium environment 100 includes a user 102 having at least one user computing device (e.g., a mobile device). In the example in FIG. 1, user 102 is illustrated as having three computing devices 104, 106, and 108. Computing device 104 depicts a tablet, computing device 106 depicts a wristwatch (e.g., a smart watch), and computing device 108 depicts a pair of eye glasses (e.g., virtual reality goggles). Computing devices 104, 106, and 108 are example user computing devices, and any suitable computing device is contemplated, such as by way of example and not limitation, a mobile phone, tablet, laptop computer, gaming device, goggles, glasses, contact lenses, watch, camera, personal digital assistant, and the like. Furthermore, discussion of one of computing devices 104, 106, and 108 is not limited to that computing device, but generally applies to each of computing devices 104, 106, and 108. Moreover, the computing devices 104, 106, and 108 may range from full resource devices with substantial memory and processor resources (e.g., personal computers, game consoles) to a low-resource device with limited memory or processing resources (e.g., mobile devices).

Various types of input devices and input instrumentalities can be used to provide input to computing devices 104, 106, and 108. For example, computing devices 104, 106, and 108 can recognize input as being a mouse input, stylus input, touch input, input provided through a natural user interface, and the like. Thus, computing devices 104, 106, and 108 can recognize multiple types of gestures including touch gestures and gestures provided through a natural user interface.

Figure 6:
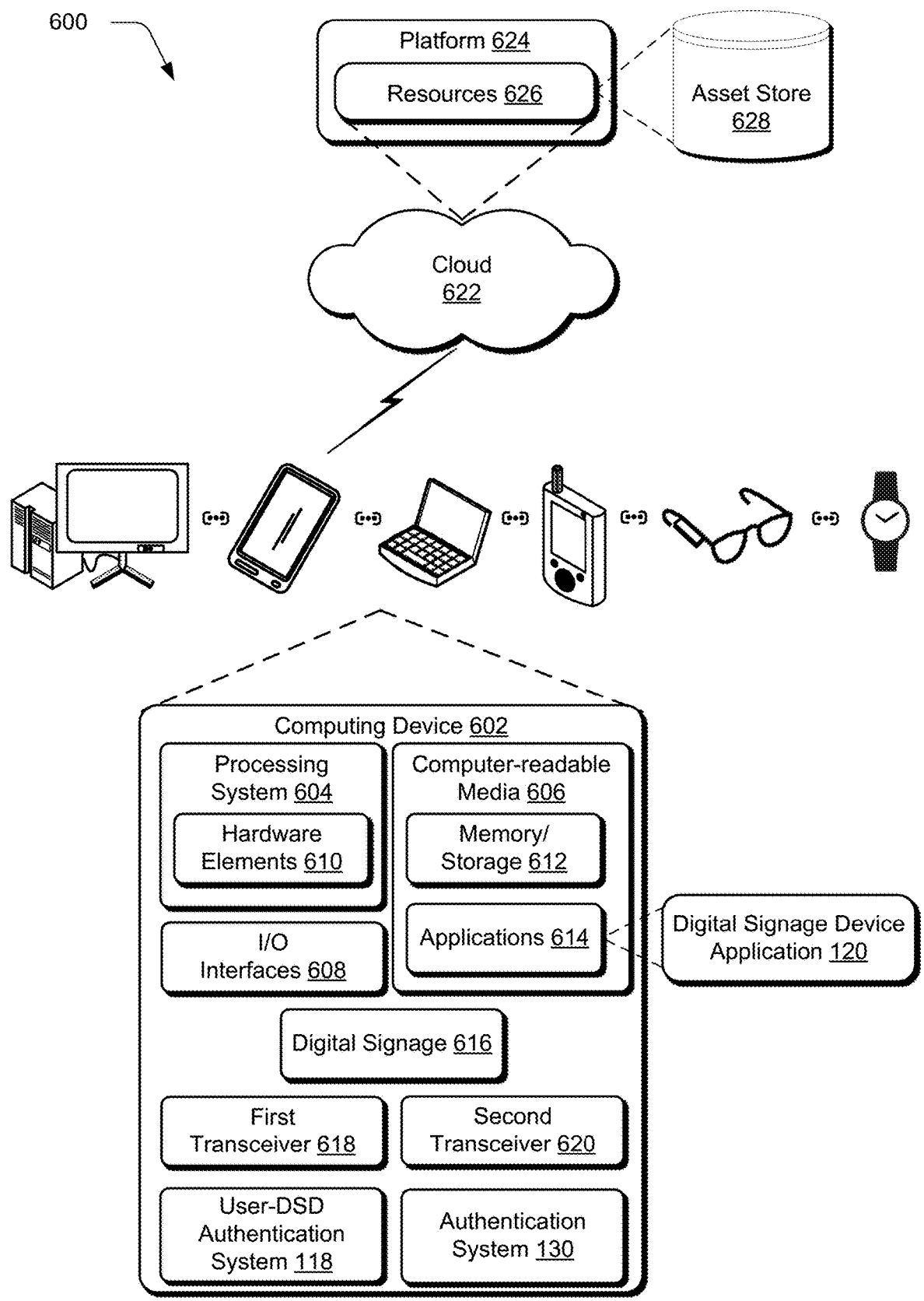
FIG. 6 illustrates an example system including various components of an example device that can be implemented as any type of user computing device, digital signage device, and/or server device as described and/or utilized with reference to FIGS. 1-5 to implement aspects of the techniques described herein.

Furthermore, computing devices 104, 106, and 108 may be representative of one or a plurality of different devices, such as one or more devices connected to a network that perform operations "over the cloud" as further described in relation to FIG. 6.

In environment 100, user 102 is in proximity of shop 110. Shop 110 can be any suitable shop, retail store, place of business, church, courtroom, community hall, conference hall, and the like that includes a digital signage device 112. For instance, shop 110 may be a retail store that displays digital signage device 112 in a window of the retail store for customers to see and potentially interact with as they walk by the store. In another example, shop 110 may be an automobile dealer with a kiosk including digital signage device 112 inside the dealership that displays videos, statistics, advertisements, and the like, about automobiles for sale by the dealership.

In the example illustrated in FIG. 1, computing device 106 is communicatively coupled to digital signage device 112 via a first communication channel. Computing devices 104 and 108 may alternatively or additionally be coupled to digital signage device 112. It is to be understood that computing device 106 is illustrated in FIG. 1 coupled to digital signage device 112 for convenience. In one example, communication between computing device 106 and digital signage device 112 via the first communication channel is done according to a low emissions protocol (e.g., Bluetooth or Bluetooth Low Emissions (BLE)). Furthermore, computing devices 104, 106, and 108 may or may not be connected to a network, such as the Internet, cellular network, or Wi-Fi network using a communication channel other than the first communication channel In one example, computing devices 104, 106, and 108 are not directly connected to the Internet. For instance, computing devices 104, 106, and 108 may be located in an underground parking garage where no Internet access is available.

Network 114 communicatively couples the digital signage device 112 with server 116. Network 114 may comprise a variety of networks, including the Internet, an intranet, local area network (LAN), wide area network (WAN), personal area network (PAN), cellular networks, terrestrial networks, satellite networks, combinations of networks, and the like, and as such may be wired, wireless, or a combination thereof. Network 114 includes a second communication channel to couple digital signage device 112 with server 116. The second communication channel is a different communication channel than the first communication channel between computing device 106 and digital signage device 112, and may use different communications protocols. In one example, communications via the second communication channel are according to a protocol using encrypted communications (e.g., https).

Server 116 may include one or more servers or service providers that provide services and/or resources to digital signage device 112 and computing devices 104, 106, and 108 via digital signage device 112. Server 116 includes user-DSD authentication system 118 configurable to authenticate a computing device, such as computing devices 104, 106, and 108, to digital signage device 112 (described in more detail below).

Generally, resources provided by server 116 may be licensed, purchased, or may be made freely available, (e.g., without authentication, license, or account-based access). The resources can include any suitable combination of services and content, such as made available over network 114 by one or more providers. Some examples of services include, but are not limited to, an online shopping service, a photo editing service, a web development and management service, a collaboration service, a social networking service, a messaging service, an advertisement service, a graphics design service, an on-line shopping service, and so forth. Content may include various combinations of assets, including videos, ads, audio, multi-media streams, animations, images, web documents, web pages, applications, device applications, text documents, drawings, presentations, user profiles, user preferences, user data, and the like.

Example Digital Signage Device Application in Computing Device

A user computing device, such as computing devices 104, 106, and 108, includes digital signage device application 120, which may be implemented by the computing device to authenticate the computing device to a digital signage device, such as digital signage device 112. Digital signage device application 120 includes factorization processing module 122, request generation module 124, resolution calculation module 126, and authentication verification module 128. Factorization processing module 122 is representative of functionality configured to manage the factorization known to the computing device and server 116. The factorization may include two or more prime numbers, and factorization processing module 122 can manage the factorization in any suitable way, such as by storing the prime numbers, storing a composite number obtained from the prime numbers, generating the prime numbers, communicating the factorization with server 116 (such as receiving the factorization from server 116 or providing the factorization to server 116). For instance, the factorization (e.g., two prime numbers) may be previously agreed upon between computing device 104, 106, and 108, and server 116, such as before user 102 arrived in proximity to shop 110. Hence, the factorization may be stored at computing device 104, 106, and 108, and also at server 116.

Request generation module 124 is representative of functionality configured to generate an authentication request and send the request to digital signage device 112. The authentication request may include a request to authenticate the computing device to digital signage device 112, including a request to log into digital signage device 112 and/or expose user data (e.g., sensitive or private data) to digital signage device 112.

Request generation module 124 may send the request responsive to successful pairing between the computing device and digital signage device 112. Here, pairing refers to the computing device (e.g., computing device 104, 106, or 108) and digital signage device 112 being communicatively coupled, such as according to a Bluetooth protocol. Hence, request generation module 124 can send the authorization request automatically and without user intervention. Furthermore, the authorization request may include a username associated with the computing device (e.g., computing device 104, 106, or 108), and server 116 may store the factorization according to the username in the authorization request. In one example, request generation module 124 generates and sends an authentication request responsive to a user instruction, (e.g., a user selects an option in a user interface to request authentication).

Resolution calculation module 126 is representative of functionality configured to receive a challenge including a random number from digital signage device 112 and generate a resolution based on the challenge received from digital signage device 112 and the factorization known to the computing device and server 116. Resolution calculation module 126 generates the resolution in such a way to prove the computing device knows the factorization, without exposing the factorization in the resolution. In one example, resolution calculation module 126 generates the resolution according to ZKP construction in which a first prime factor included in the factorization is raised to a random number (e.g., the random number included in the challenge), and the result is constrained to be within a finite field with a modulo operator determined from a second prime factor included in the factorization. The prime factors are generally very large numbers, making it effectively impossible to guess the factorization from the resolution with one guess. In another example, resolution calculation module 126 generates the resolution according to ZKP construction by forming a composite number from the prime factors, such as by multiplying the first prime factor with the second prime factor.

Authentication verification module 128 is representative of functionality configured to receive a verified indicator and/or user data from server 116 via digital signage device 112, and to provide user data (e.g., user data stored on computing device 104, 106, or 108) to digital signage device 112, such as for display on digital signage device 112. The verified indicator indicates that the computing device is authenticated to digital signage device 112 by server 116. An example of user data provided to authentication verification module 128 is targeted advertisement recommendations generated by server 116 based on a username in the authorization request. Such user data (e.g., targeted advertisements) can be displayed on computing device 104, 106, or 108, digital signage device 112 or both the computing device and digital signage device 112. An example of user data provided by the computing device to digital signage device 112 is a configuration file that a user has completed with a mobile device (e.g., computing device 104, 106, and 108). The configuration file may include user preferences and options for a product, such as an automobile, that the user wishes to share with others, such as salespersons at an automobile dealer.

Authentication verification module 128 allows an authenticated computing device to interact with digital signage device 112 in any suitable way. For instance, a user of an authenticated computing device may login to digital signage device 112, execute applications running on digital signage device 112, control display of information on digital signage device 112, and the like. In one example, digital signage device 112 includes a heads-up-display (HUD) in an automobile that is configurable to electronically communicate with a user's mobile phone (e.g., via low-emissions communications). The mobile phone can be used to configure the HUD to control options for the HUD and dashboard, including location of tachometer and speedometer, color and brightness of instrumentation, units of measure (e.g., mph or kph), cruise control parameters (e.g., acceleration and deceleration rates), enable rear- and/or side-view cameras, display engine parameters (e.g., oil temperature, fuel efficiency, transmission temperature, current transmission gear, etc.), and the like. The user can preconfigure options on a desktop computer at the user's home, and transfer a configuration file representing the preconfigured options to the user's mobile phone and/or a remotely located server. The mobile phone can be authenticated with the HUD when the automobile is started, when the key is placed in the ignition, or when the user selects an option on the mobile device and/or the HUD to authenticate the mobile device. Once, authenticated, the HUD can receive the configuration file from the user's mobile device and/or the remotely located server (e.g., via a satellite transceiver include in the automobile coupled to the server), and configure the HUD and dashboard according to the configuration file. The user can also interact with the HUD using the authenticated mobile device to further configure the HUD, such as change the instrumentation brightness from what was designated in the configuration file.

Example Authentication System in Digital Signage Device

Digital signage device 112 includes authentication system 130 to authenticate a computing device to the digital signage device. Authentication system 130 includes request processing module 132, challenge processing module 134, resolution processing module 136, and user data module 138. Request processing module 132 is representative of functionality configured to receive an authentication request from a computing device (e.g., computing device 104, 106, or 108) and send the authentication request to server 116.

Challenge processing module 134 is representative of functionality configured to receive a challenge including a random number (e.g., a randomly generated number) and a token from server 116. The token is a one-time-use token—for example, the token expires after being used a single time. Challenge processing module 134 maintains the token at digital signage device 112, such as by removing the token from the challenge and storing the token at storage 140, and does not use, or expire, the token. Storage 140 may be included in or otherwise accessible to digital signage device 112. Challenge processing module 134 sends the challenge including the random number, but without the token, to the computing device (e.g., computing device 104, 106, or 108).

Challenge processing module 134 makes the token available to resolution processing module 136.

Resolution processing module 136 is representative of functionality configured to receive a resolution from the computing device (e.g., computing device 104, 106, or 108), retrieve the token (e.g., from storage 140 or from challenge processing module 134), and send the resolution and the token to server 116 to authenticate the computing device.

User data module 138 is representative of functionality configured to receive a verified indicator and user data from server 116, and receive user data from the computing device (e.g., computing device 104, 106, or 108). User data module 138 also sends user data received from server 116 to the computing device, e.g., to display the user data on the computing device, such as computing device 104, 106, or 108. User data module 138 may configure the user data for display, or data configured according to the user data, on digital signage device 112.

Digital signage device 112 also includes processors 142. Hence, authentication system 130 may be implemented at least partially by executing instructions stored on storage 140 and executed on processors 142. Furthermore, data (e.g., images, videos, documents, animations, 3D renderings, computer simulations, and the like) can be stored on storage 140 and/or displayed on display 144 included in digital signage device 112. Display 144 can be any suitable type of display, such as a projector and screen, liquid crystal display, plasma display, light-emitting diode display, touchscreen display, hologram, reflections against a surface or particle, combinations thereof, and the like. Moreover, digital signage device 112 includes communication interfaces 146 for enabling communication between digital signage device 112 and the computing device (e.g., computing device 104, 106, or 108), and between digital signage device 112 and server 116, e.g., to supply data to and from the modules included in authentication system 130.

Having considered an example digital medium environment, consider now a discussion of an example system usable to authenticate a computing device to a digital signage device.

Example Authentication System

Figure 2:
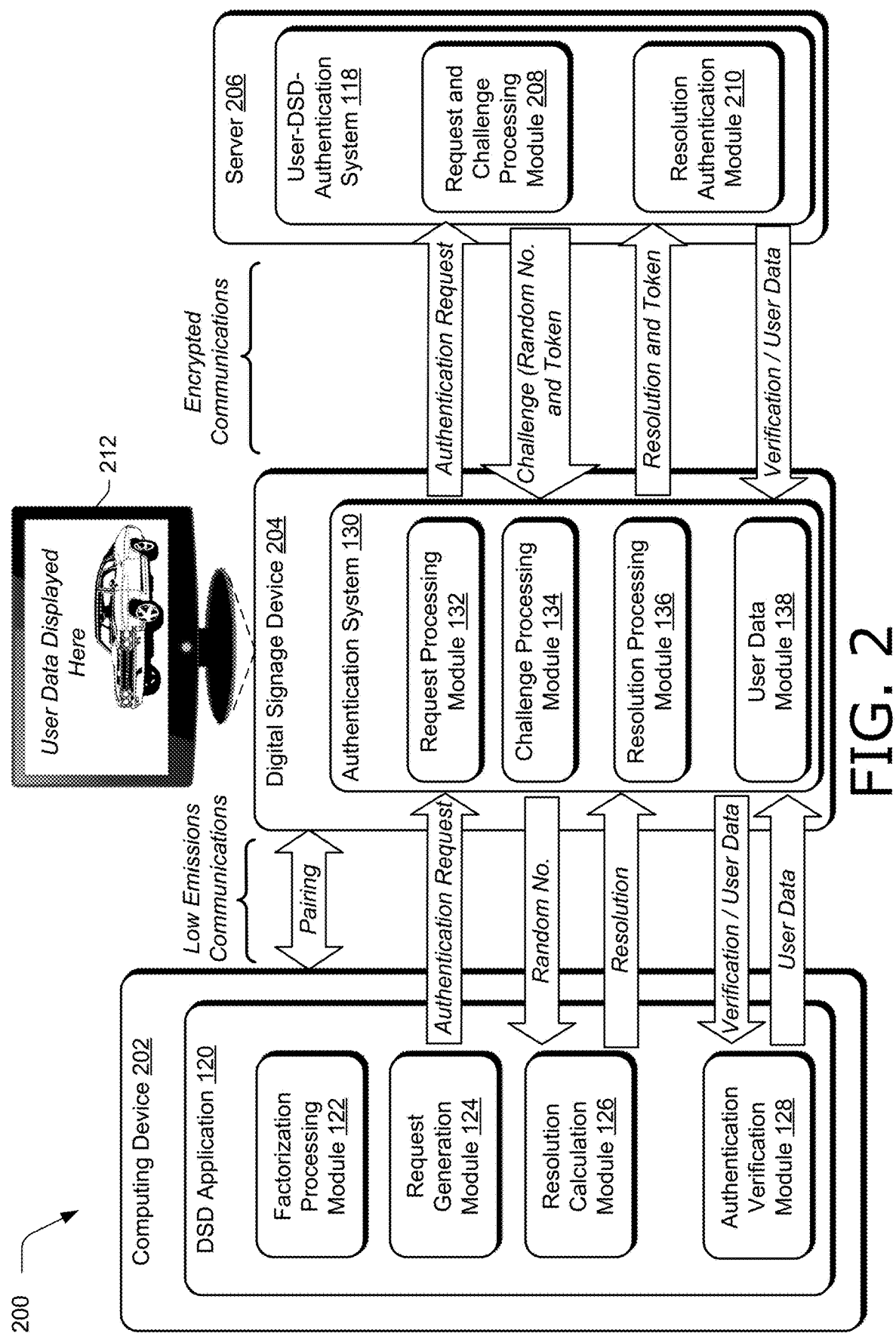
FIG. 2 illustrates an example system usable to authenticate a user computing device to a digital signage device in accordance with one or more aspects of the disclosure.

FIG. 2 illustrates an example system 200 usable to authenticate a computing device to a digital signage device. In this implementation, example system 200 includes computing device 202, digital signage device 204, and server 206. Computing devices 104, 106, and 108 in FIG. 1 are examples of computing device 202. Digital signage device 112 in FIG. 1 is an example of digital signage device 204. Server 116 in FIG. 1 is an example of server 206. Though illustrated as separate devices in FIG. 2, digital signage device 204 and server 206 can be included in a same device, or one or more collocated computing devices. Additionally or alternatively, server 206 can be remotely located from digital signage device 204 and include a different computing device than digital signage device 204.

Communication between computing device 202 and digital signage device 204 is via a first communication channel, such as according to a low emissions protocol (e.g., Bluetooth or Bluetooth Low Emissions (BLE)). Communications via the first communication channel may be encrypted or unencrypted. Communications via the first communication channel may be low power communications usable only when computing device 202 and digital signage device 204 are near one another, such as within a few meters of one another. Communication between digital signage device 204 and server 206 is via a second communication channel, such as according to a protocol using encrypted communications (e.g., https) over one or more networks. Thus, digital signage device 204 isolates computing device 202 from server 206, which is exploited by system 200 to ensure secure authentication of computing device 202 to digital signage device 204.

To authenticate computing device 202 to digital signage device 204 and server 206, computing device 202 includes digital signage device application 120, digital signage device 204 includes authentication system 130, and server 206 includes user-DSD authentication system 118. Digital signage device application 120 and authentication system 130 include modules as previously described. User-DSD authentication system 118 includes request and challenge processing module 208, and resolution authentication module 210.

No cumbersome QR codes or login forms, or shared unsecure beacons are needed by system 200 to authenticate computing device 202. Instead, digital signage device application 120 can be loaded onto computing device 202, configured, and executed as a background process so that authenticating computing device 202 is seamless to a user of computing device 202. When digital signage device application 120 is installed and configured on computing device 202, or at any suitable time thereafter, factorization processing module 122 obtains a factorization for a username associated with computing device 202. The factorization and username are also known to server 206. In one example, server 206 determines the factorization and provides it to computing device 202, such as via the Internet when digital signage device application 120 is installed or configured on computing device 202. In another example, factorization processing module 122 generates the factorization and communicates it to a secure location, accessible by server 206, and repeats the process over time to update the factorization. Updating the factorization can be done at any suitable time, such as periodically, when computing device 202 has a network connection and is not in use (e.g., late at night), responsive to an internet connection being detected, when a user completes a transaction (e.g., a purchase with an on-line retailer), responsive to a user logging into or starting digital signage device application 120, and the like. Thus, security can be maintained by system 200 by keeping the factorization fresh (e.g., recently updated).

When computing device 202 is proximate to digital signage device 204, pairing between computing device 202 and digital signage device 204 may occur. For instance, Bluetooth pairing may be initiated by a user, or happen automatically and without user intervention. In one example, pairing occurs responsive to a user selection in a user interface of computing device 202 that is made accessible to a user when computing device 202 becomes proximate to digital signage device 204. For instance, a dialog box can pop up in an interface of computing device 202 with a user-selectable option to confirm that pairing is desired before allowing computing device 202 to successfully pair with digital signage device 204.

Responsive to pairing being successfully determined, request generation module 124 generates an authentication request and sends it to digital signage device 204. The authentication request may include a username associated with computing device 202, such as an account name of a user logged into digital signage device application 120. The authentication request indicates that computing device 202 desires to be authenticated to digital signage device 204. For instance, a user of computing device 202 may want to display user data on display 212 included in digital signage device 204, or obtain data (e.g., personalized advertisement recommendations) and render the data on computing device 202. In one example, request generation module 124 generates an authentication request responsive to a user selection of an option in a user interface, such as a "confirm to send authentication request" selectable option (e.g., a button, checkbox, or drop-down menu item).

Request processing module 132 in digital signage device 204 receives the authentication request and sends it to server 206. Request and challenge processing module 208 in server 206 receives the authentication request, and generates a challenge. The challenge includes a random number and a one-time-use token. Once used, the token expires and becomes invalid. Request and challenge processing module 208 stores the random number with the username in the authentication request in storage/memory in or accessible by server 206, and sends the challenge to challenge processing module 134 in digital signage device 204.

Challenge processing module 134 receives the challenge from server 206, and separates the random number in the challenge from the token in the challenge. Challenge processing module 134 maintains the token, such as by storing the token at digital signage device 204, and sends the random number, or challenge without the token, to resolution calculation module 126 in computing device 202.

Resolution calculation module 126 receives the random number from digital signage device 204 and, based on the received random number and the factorization obtained in factorization processing module 122, generates a resolution. Resolution calculation module 126 generates the resolution in such a way to prove computing device 202 knows the factorization, without exposing the factorization in the resolution. For instance, the resolution is generated according to a ZKP construction, in which knowledge of a fact can be proved without revealing the fact.

In one example, the factorization comprises a first prime factor and a second prime factor. The resolution is generated by first raising the first prime factor to the received random number. The exponential result is next constrained to be within a finite field with a modulo operator determined from the second prime factor. For instance, the resolution R can be generated by calculating $$R = g^a \% N$$

where g and N are first and second prime factors, respectively, and a is the received random number in the challenge (e.g., a random, positive integer). Here the operator % represents modulo arithmetic and returns the remainder of the exponential result within the finite field 0 . . . N−1. The prime factors are generally very large numbers, making it effectively impossible to guess the factorization from the resolution with one guess, or even a limited number of guesses. A username associated with computing device 202, such as a username included in the authentication request generated and sent by request generation module 124, may be included with the resolution generated in resolution calculation module 126.

Furthermore, the first prime factor (e.g., N) can be a safe prime number. Hence, the first prime factor can be of the form N=2·q+1 where q is a prime number. In addition, the second prime factor (e.g., g) can be a generator modulo N, which means that for any X where 0<X<N, there exists a value x for which $g^x \% N = X$.

The resolution can be formed from the factorization in any suitable way in which the resolution demonstrates (e.g., proves) knowledge of a fact without revealing the fact in the resolution. In one example, the resolution is generated by forming a composite number from the prime factors, such as by multiplying the first prime factor with the second prime factor.

Resolution calculation module 126 sends the resolution to resolution processing module 136 in digital signage device 204. Resolution processing module 136 receives the resolution from computing device 202, and retrieves the one-time-use token removed from the challenge by challenge processing module 134. Resolution processing module 136 sends the resolution and the one-time-use token to resolution authentication module 210 in server 206.

Resolution authentication module 210 receives the resolution and the one-time-use token from digital signage device 204. Resolution authentication module 210 generates or obtains an expected resolution for the username associated with computing device 202. For instance, resolution authentication module 210 retrieves the random number included in the challenge generated by request and challenge processing module 208 (e.g., from storage at server 206), and retrieves the factorization associated with the username included in the resolution. With these retrieved parameters, resolution authentication module 210 can calculate an expected resolution. In one example, an expected resolution $\hat{R}$ is calculated according to $\hat{R}=\hat{g}^\alpha \% \hat{N}$, where $\hat{g}$ and $\hat{N}$ are copies of a factorization obtained by resolution authentication module 210, such as associated with the username of a computing device.

If the one-time-use token is not expired (e.g., it has not been used or executed) and the resolution from digital signage device 204 matches the expected resolution obtained by resolution authentication module 210, then resolution authentication module 210 declares computing device 202 to be authenticated and sends a verified indicator and user data to user data module 138 in digital signage device 204.

If, on the other hand, the one-time-use token is expired, or the resolution from digital signage device 204 does not match the expected resolution obtained by resolution authentication module 210, then resolution authentication module 210 declares computing device 202 to be un-authenticated. In this case, resolution authentication module 210 resolution authentication module 210 sends an unverified indicator to user data module 138 in digital signage device 204 (e.g., the unverified indicator may be the complement of the verified indicator), and declines to send user data to the digital signage device.

User data module 138 in digital signage device 204 receives the verified/unverified indicator and user data from server 206. User data module 138 displays user data on display 212, and provides user data to computing device 202 only for authenticated computing devices, as determined by the verified indicator provided by server 206. User data module 138 sends the verified/unverified indicator and user data from server 206 to authentication verification module 128 in computing device 202.

Once notified of being authenticated via the verified indicator from digital signage device 204, authentication verification module 128 can provide user data from computing device 202 to user data module 138 for display on display 212 by digital signage device 204. For instance, display 212 in FIG. 2 displays a car, such as a car preconfigured by a user of computing device 202 to share with a car dealer that operates digital signage device 204.

The authentication process can be repeated at any suitable time, such as periodically to make sure computing device repeatedly generates a correct resolution with different random numbers supplied by server 206. In one example, authentication of computing device 202 is not granted by server 206 until computing device 202 generates a prescribed number of correct resolutions (e.g., resolutions that match expected resolutions of server 206). For instance, J of K (J≤K) resolutions for different authentication requests must be correctly authenticated for computing device 202 to be declared authenticated by server 206.

System 200 is secure to a man-in-the-middle attack. For instance, an unauthorized user may attempt to be falsely authenticated by recording and re-transmitting communications over the first communication channel between computing device 202 and digital signage device 204 in an attempt to guess or learn the factorization. However, since the one-time-use token is not exposed to the first communication channel, the unauthorized user will be unable to be authenticated by system 200. Furthermore, since the token expires after one use, an unauthorized user will be unable to re-use the token, if obtained from the second communication channel, for repeat guesses.

System 200 does not require computing device 202 to be directly connected to server 206. Instead, since communication to server 206 is done via the second communication channel from digital signage device 204, and not from computing device 202 directly, system 200 ensures that computing device 202 is on-site (e.g., proximate) with respect to digital signage device 204. Hence, system 200 is robust to hacking or hijacking from a remote location (e.g., a device located away from digital signage device 204 that attempts to be authenticated).

System 200 constitutes an improvement over current authentication systems which primarily authenticate a computing device to a digital signage device with QR codes, login forms, or shared broadcast beacons, and thus are cumbersome and/or insecure. In contrast, system 200 facilitates authentication of computing device 202 with digital signage device 204 by using a resolution proving computing device 202 knows a factorization without exposing the factorization in the resolution, and a one-time-use token maintained by digital signage device 204 and not exposed to computing device 202. Hence, authentication is seamless and secure, making system 200 suitable for exposing sensitive and private data (e.g., user data) to digital signage device 204.

Having considered an example system 200, consider now a discussion of example procedures for authenticating a computing device to a digital signage device in accordance with one or more aspects of the disclosure.

Example Procedures

Figure 3:
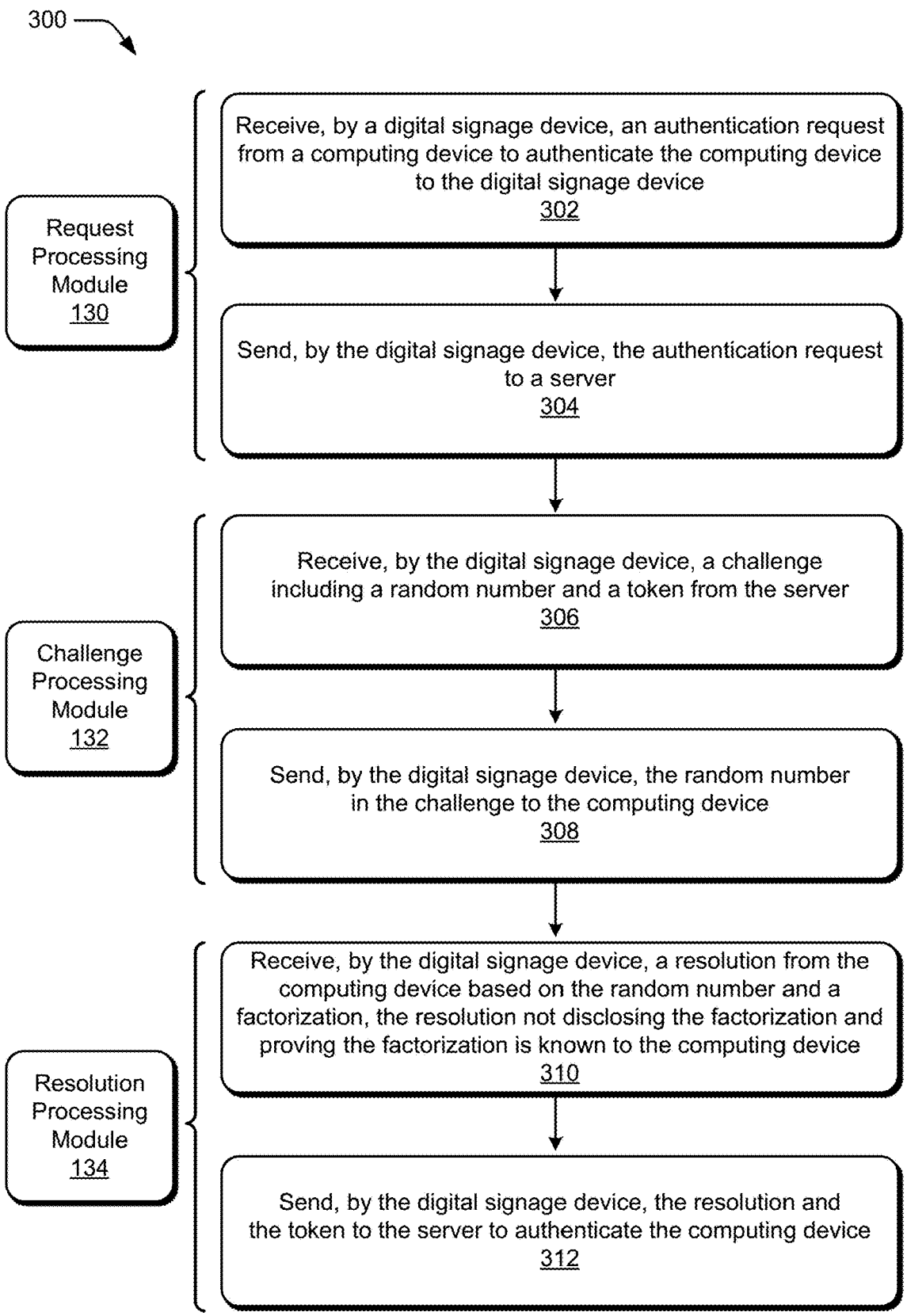
FIG. 3 is a flow diagram depicting an example procedure in accordance with one or more aspects of the disclosure.

FIG. 3 illustrates an example procedure 300 for authenticating a computing device to a digital signage device in accordance with one or more aspects of the disclosure. Aspects of the procedure may be implemented in hardware, firmware, or software, or a combination thereof. The procedure is shown as a set of blocks that specify operations performed by one or more devices and are not necessarily limited to the orders shown for performing the operations by the respective blocks. In at least some aspects the procedure may be performed in a digital medium environment by a suitably configured device, such as the example digital signage device 112 of FIG. 1 that makes use of an authentication system, such as authentication system 130. An authentication system implementing procedure 300 may be an independent application that has been installed on digital signage device 112, a service hosted by a service provider that is accessible by digital signage device 112, or a plug-in module to digital signage device 112.

A digital signage device, such as digital signage device 112 in FIG. 1 or digital signage device 204 in FIG. 2, receives an authentication request from a computing device to authenticate the computing device to the digital signage device (block 302). The authentication request can include a username associated with the computing device. The authentication request can also include a request to log into the digital signage device, so the digital signage device can be controlled by the computing device. In one example, the authentication request is sent from the computing device responsive to the computing device coming in proximity to the digital signage device, and a successful pairing established between the computing device and the digital signage device. The authentication request may be sent by the computing device based upon user consent to send the authentication request.

In one example, the computing device is not connected to the server without the digital signage device (e.g., the computing device is not directly connected to the server). For instance, the computing device is not able to communicate with the server directly and requires aid of the digital signage device to receive data from the server. Furthermore, the user computing device (e.g., a mobile phone or tablet) may or may not be directly connected to a network, such as the Internet, cellular network, Wi-Fi network, and the like.

The digital signage device sends the authentication request to a server (block 304). The authentication request sent to the server can include a username associated with the computing device.

The digital signage device receives a challenge including a random number and a token from the server (block 306). The token is a one-time-use token and expires responsive to the one-time-use. For instance, once the token is used, it cannot be used again. The random number is a randomly generated number.

The digital signage device sends the random number in the challenge to the computing device (block 308). Sending the random number in the challenge to the computing device includes sending the random number in the challenge without sending the token in the challenge. For instance, the digital signage device maintains the token, such as by removing the token from the challenge and storing the token. The digital signage device does not use, or otherwise execute the token.

The digital signage device receives a resolution from the computing device based on the random number and a factorization (block 310). The resolution does not disclose the factorization, and proves the factorization is known to the computing device. The factorization is known to the computing device and the server. In one example, the factorization includes a first prime factor and a second prime factor. The resolution can be based on a random number (e.g., the random number from the challenge) and the factorization by raising the first prime factor of the factorization to the random number, and computing a modulo result with the second prime factor of the factorization. Furthermore, the resolution can include a username, such as a username included in the authentication request.

The digital signage device sends the resolution and the token to the server to authenticate the computing device (block 312). Since the digital signage device does not execute the one-time-use token, the token remains valid when sent to the server. The resolution and the token can be combined and sent in any suitable way. In one example, the resolution and the token are concatenated and sent together. In another example, the resolution and the token are sent separately from each other, such as on different carriers, in different packets, at different times, combinations thereof, and the like. For instance, the resolution can be sent in a first transmission and the token can be sent in a second transmission, or the resolution and token can be combined into a single transmission.

In one example, receiving the request, sending the random number in the challenge, and receiving the resolution are via communications in a first communication channel. Furthermore, sending the request, receiving the challenge, and sending the resolution are via communications in a second communication channel. Communications in the first communication channel can be according to a low emissions protocol (e.g., low power communications targeted for proximate devices), and communications in the second communications channel can be encrypted and secure communications.

Figure 4:
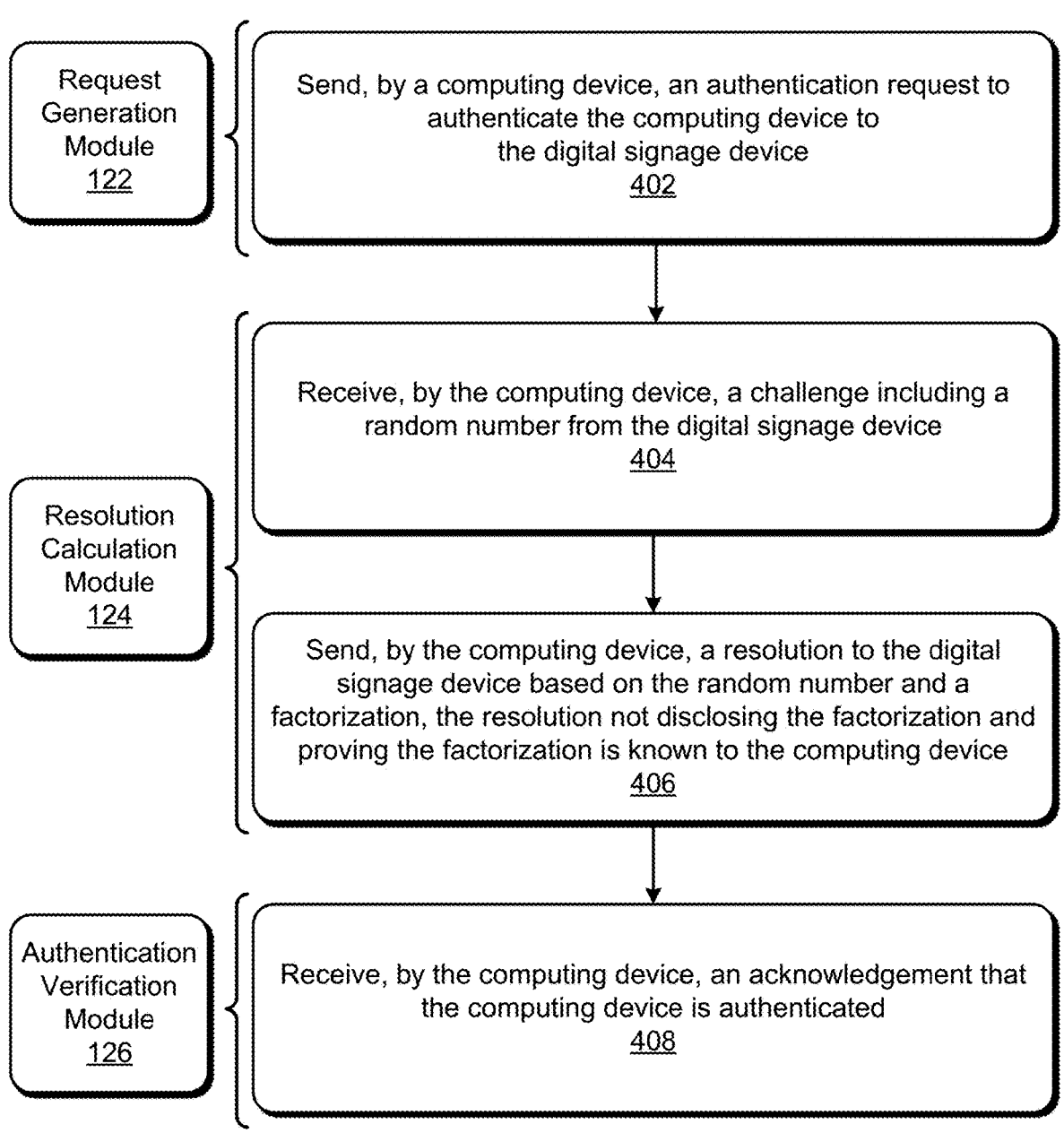
FIG. 4 is a flow diagram depicting an example procedure in accordance with one or more aspects of the disclosure.

FIG. 4 illustrates an example procedure 400 for authenticating a computing device to a digital signage device in accordance with one or more aspects of the disclosure. Aspects of the procedure may be implemented in hardware, firmware, or software, or a combination thereof. The procedure is shown as a set of blocks that specify operations performed by one or more devices and are not necessarily limited to the orders shown for performing the operations by the respective blocks. In at least some aspects the procedure may be performed in a digital medium environment by a suitably configured device, such as one or more of computing devices 104, 106, and 108 of FIG. 1 and computing device 202 in FIG. 2 that make use of a digital signage device application, such as digital signage device application 120. A digital signage device application implementing procedure 400 may be an independent application that has been installed on a computing device (e.g., computing devices 104, 106, 108, and 202), a service hosted by a service provider that is accessible by the computing device, or a plug-in module to the computing device.

The computing device sends an authentication request to authenticate the computing device to the digital signage device (block 402). The authentication request can be associated with the computing device in any suitable way. In one example, the authentication request includes a username associated with the computing device, such as a login name used to access a digital signage device application running on the computing device.

The computing device receives a challenge including a random number from the digital signage device (block 404). The random number can be generated by a server coupled to the digital signage device, but not in direct communication with the computing device.

The computing device sends a resolution to the digital signage device based on the random number and a factorization (block 406). The resolution does not disclose the factorization and proves the factorization is known to the computing device. For instance, the resolution can be based on a ZKP of the factorization, in which knowledge of a fact can be proved without revealing the fact. In one example, the factorization includes a first prime factor and a second prime factor. The resolution can be based on a random number (e.g., the random number from the challenge) and the factorization by raising the first prime factor of the factorization to the random number, and computing a modulo result with the second prime factor of the factorization.

The computing device receives an acknowledgement that the computing device is authenticated (block 408). In response to being authenticated, the computing device and/ or a server can send user data to the digital signage device, and the digital signage device can display information based on the supplied user data. For instance, the digital signage device can display sensitive and private information about a user of the computing device since the computing device has been authenticated. In one example, the computing device receives an advertisement based on a username in the authentication request, and displays the advertisement on the computing device.

In an example, the computing device receives a query (e.g., from the digital signage device) confirming that the computing device should authenticate with the digital signage device. For instance, the digital signage device may send a confirmation message to the computing device in the form of a query, and the computing device must respond to the query affirmatively to confirm authentication is desired. If no affirmative confirmation to the query is received by the digital signage device, the computing device can be designated as unauthenticated, in which case user data corresponding to the computing device is not exposed to the digital signage device from the computing device or a server.

Figure 5:
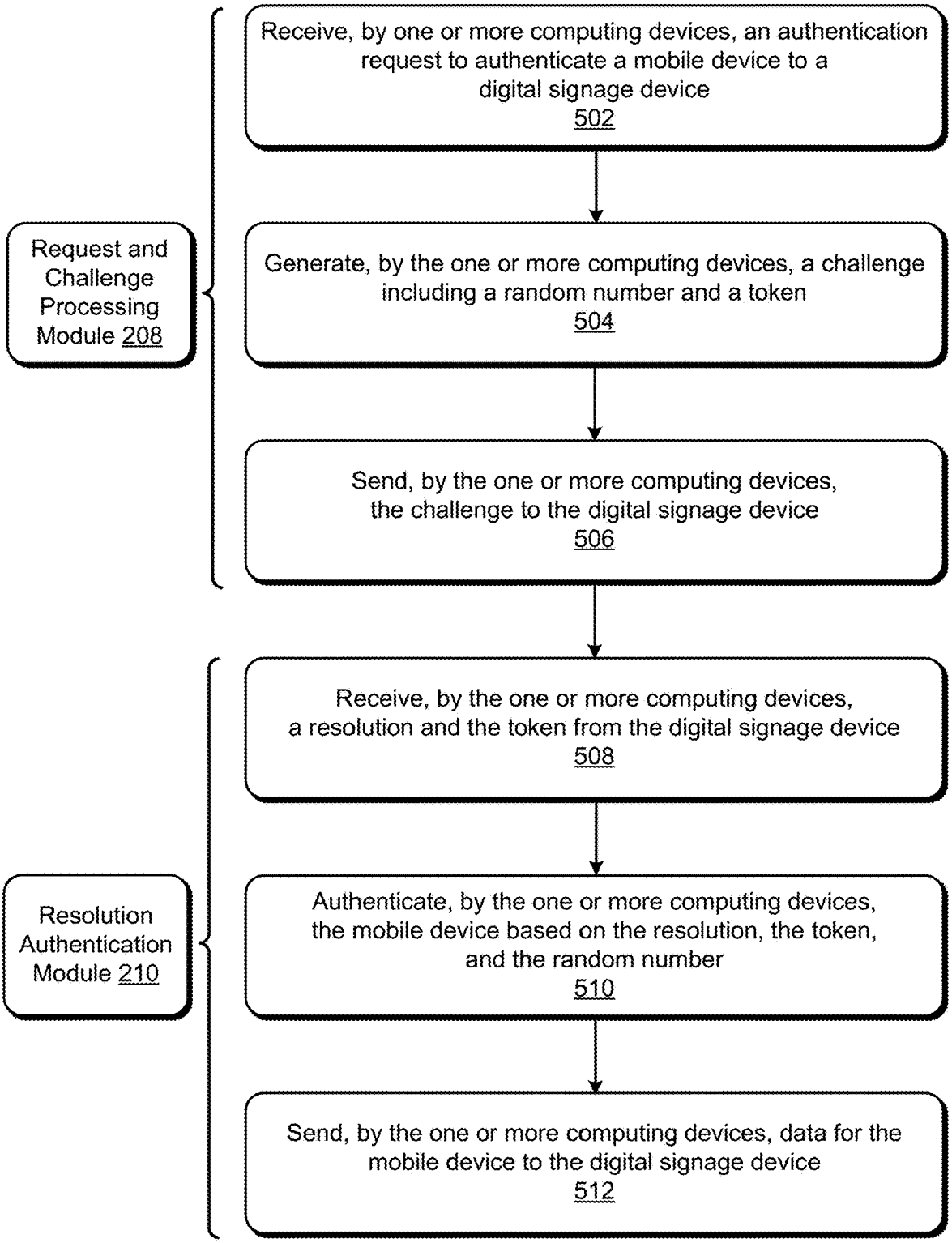
FIG. 5 is a flow diagram depicting an example procedure in accordance with one or more aspects of the disclosure.

FIG. 5 illustrates an example procedure 500 for authenticating a computing device to a digital signage device in accordance with one or more aspects of the disclosure. Aspects of the procedure may be implemented in hardware, firmware, or software, or a combination thereof. The procedure is shown as a set of blocks that specify operations performed by one or more devices and are not necessarily limited to the orders shown for performing the operations by the respective blocks. In at least some aspects the procedure may be performed in a digital medium environment by a suitably configured device or devices, such as the example server 116 of FIG. 1 or server 206 in FIG. 2 that make use of a user-DSD authentication system, such as user-DSD authentication system 118. A user-DSD authentication system implementing procedure 500 may be an independent application that has been installed on one or more computing devices, a service hosted by a service provider that is accessible by the one or more computing devices, or a plug-in module to the one or more computing devices.

One or more computing devices receive an authentication request to authenticate a mobile device to a digital signage device (block 502). The authentication request is sent to the one or more computing devices from a digital signage device using encrypted communications. The authentication request is generated from the mobile device, such as responsive to the mobile device being proximate to the digital signage device.

The one or more computing devices generates a challenge including a random number and a token (block 504). The token is a one-time-use token. The random number can be obtained in any suitable way, such as with a random number generator included in the one or more computing devices.

The one or more computing devices send the challenge to the digital signage device (block 506). The challenge sent to the digital signage device includes both the random number and the token.

The one or more computing devices receive a resolution and the token from the digital signage device (block 508). The resolution is generated by the mobile device. The resolution can be based on a random number (e.g., the random number from the challenge) and a factorization, known to both the mobile device and the one or more computing devices, by raising a first prime factor of the factorization to the random number, and computing a modulo result with a second prime factor of the factorization.

The one or more computing devices authenticate the mobile device based on the resolution, the token, and the random number (block 510). For instance, the one or more computing devices can calculate an expected resolution based on a username included in the authentication request and/or the resolution, a factorization stored in or accessible by the one or more computing devices and associated with the username, and the random number included in the challenge. If the one-time-use token received by the one or more computing devices is not expired (e.g., it has not been executed), and the resolution received from the digital signage device matches the expected resolution, then the one or more computing devices declares the mobile device to be authenticated, and sends a verified indicator to the digital signage device.

The one or more computing devices send data for the mobile device to the digital signage device (block 512). Data for the mobile device provided to the digital signage device can be targeted advertisement recommendations based on a username in the authorization request. Such user data (e.g., targeted advertisements) can be displayed on the mobile device, the digital signage device, or both the mobile device and the digital signage device. In one example, a configuration file that a user has completed with the mobile device (e.g., previously completed from home with the mobile device while the mobile device was connected to a cellular network) is stored by the one or more computing devices. The configuration file may include user preferences and options for a product, such as an automobile, that the user wishes to share with others, such as salespersons at an automobile dealer. The one or more computing devices can provide the configuration file to the digital signage device to display user data (e.g., generated at the digital signage device based on the configuration file) on the digital signage device at the automobile dealer.

The procedures described herein constitute an improvement over current methods which primarily authenticate a computing device to a digital signage device with QR codes, login forms, or shared broadcast beacons, and thus are cumbersome and/or insecure. In contrast, the methods described herein facilitate authentication of a computing device with a digital signage device by using a resolution proving the computing device knows a factorization without exposing the factorization in the resolution, and a one-time-use token maintained by the digital signage device and not exposed to the computing device. Hence, authentication is seamless and secure, making the methods described herein suitable for exposing sensitive and private data (e.g., user data) to a digital signage device.

Having considered example procedures in accordance with one or more implementations, consider now example systems and devices that can be utilized to practice the inventive principles described herein.

Example Systems and Devices

FIG. 6 illustrates an example system generally at 600 that includes an example computing device 602 that is representative of one or more computing systems and devices that may implement the various techniques described herein. This is illustrated through inclusion of authentication system 130, digital signage device application 120, and user-DSD authentication system 118, which operate as described above. Computing device 602 may be, for example, a user computing device (e.g., computing device 104, 106, 108, and 202), a digital signage device (e.g., digital signage device 112 and 204), or a server device of a service provider, (e.g., server 116 and 206). Furthermore, computing device 602 may include an on-chip system, multiple computing devices, combinations thereof, or any other suitable computing device or computing system. Accordingly, FIG. 6 illustrates computing device 602 as one or more of a desktop computer (e.g., a workstation), a tablet, a laptop computer, a smart phone, smart eye glasses, and a smart wristwatch, though these examples are illustrative and in no way are meant to limit the type or number of devices included in computing device 602.

The example computing device 602 includes a processing system 604, one or more computer-readable media 606, and one or more I/O interfaces 608 that are communicatively coupled, one to another. Although not shown, computing device 602 may further include a system bus or other data and command transfer system that couples the various components, one to another. A system bus can include any one or combination of different bus structures, such as a memory bus or memory controller, a peripheral bus, a universal serial bus, and a processor or local bus that utilizes any of a variety of bus architectures. A variety of other examples are also contemplated, such as control and data lines.

Processing system 604 is representative of functionality to perform one or more operations using hardware. Accordingly, processing system 604 is illustrated as including hardware elements 610 that may be configured as processors, functional blocks, and so forth. This may include implementation in hardware as an application specific integrated circuit or other logic device formed using one or more semiconductors. Hardware elements 610 are not limited by the materials from which they are formed or the processing mechanisms employed therein. For example, processors may be comprised of semiconductor(s) and transistors (e.g., electronic integrated circuits (ICs)). In such a context, processor-executable instructions may be electronically-executable instructions. Processors 142 in FIG. 1 are examples of processors included in hardware elements 610.

Computer-readable storage media 606 is illustrated as including memory/storage 612. Storage 140 in FIG. 1 is an example of memory/storage included in memory/storage 612. Memory/storage 612 represents memory/storage capacity associated with one or more computer-readable media. Memory/storage component 612 may include volatile media (such as random access memory (RAM)), nonvolatile media (such as read only memory (ROM), Flash memory, optical disks, magnetic disks, and so forth), or combinations thereof. Memory/storage component 612 may include fixed media (e.g., RAM, ROM, a fixed hard drive, and so on) as well as removable media (e.g., Flash memory, a removable hard drive, an optical disc, and so forth). Computer-readable media 606 may be configured in a variety of other ways as further described below.

Input/output interface(s) 608 are representative of functionality to allow a user to enter commands and information to computing device 602, and also allow information to be presented to the user and other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, computing device 602 may be configured in a variety of ways as further described below to support user interaction.

Computing device 602 also includes applications 614. Applications 614 are representative of any suitable applications capable of running on computing device 602, and may include a web browser which is operable to access various kinds of web-based resources (e.g., assets, media clips, content, configuration files, services, user profiles, and the like). Applications 614 include digital signage device application 120, as previously described. Furthermore, applications 614 includes any applications supporting user-DSD authentication system 118 and authentication system 130.

Computing device 602 also includes digital signage 616. Digital signage 616 is represent of any suitable signage to display resources (e.g., assets, media clips, content, configuration files, animations, drawings, services, user profiles, user data, and the like). Display 144 in FIG. 1 and display 212 in FIG. 2 are examples of digital signage 616. Digital signage 616 can include any suitable type of signage, such as one or more of a screen, a display, a projector, a reflection, a surface (e.g., a reflective or projective surface, including a wall or a non-uniform/flat surface, such as the face of a rock), a hologram, a touchscreen, a television, a sign, and the like.

Furthermore, computing device 602 includes first transceiver 618 and second transceiver 620. A transceiver (e.g., first transceiver 618 or second transceiver 620) may include transmitter and receiver functions, and include one or more transmitters and receivers. For example, a transceiver may include one or a plurality of receivers (transmitters) implemented together to perform receiving (transmitting) functions, such as with an array of antennas in a multiple-input multiple-output configuration. First transceiver 618 is configurable to transmit and receive communications in a first communication channel, such as between computing device 202 and digital signage device 204 in FIG. 2. Second transceiver 620 is configurable to transmit and receive communications in a second communication channel, such as between digital signage device 204 and server 206 in FIG. 2.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by computing device 602. By way of example, and not limitation, computer-readable media may include "computer-readable storage media" and "computer-readable signal media."

"Computer-readable storage media" refers to media, devices, or combinations thereof that enable persistent or non-transitory storage of information in contrast to mere signal transmission, carrier waves, or signals per se. Thus, computer-readable storage media does not include signals per se or signal bearing media. The computer-readable storage media includes hardware such as volatile and non-volatile, removable and non-removable media, storage devices, or combinations thereof implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" refers to a signal-bearing medium that is configured to transmit instructions to the hardware of the computing device 602, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 610 and computer-readable media 606 are representative of modules, programmable device logic, fixed device logic implemented in a hardware form, or combinations thereof that may be employed in some aspects to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions, logic embodied by the hardware, or combinations thereof, as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions, logic embodied on some form of computer-readable storage media or by one or more hardware elements 610, or combinations thereof computing device 602 may be configured to implement particular instructions and functions corresponding to the software and hardware modules. Accordingly, implementation of a module that is executable by computing device 602 as software may be achieved at least partially in hardware, e.g., through use of computer-readable storage media and hardware elements 610 of processing system 604. The instructions and functions may be executable/operable by one or more articles of manufacture (for example, one or more computing devices 602 or processing systems 604) to implement techniques, modules, and examples described herein.

The techniques described herein may be supported by various configurations of computing device 602 and are not limited to the specific examples of the techniques described herein. This functionality may also be implemented all or in part through use of a distributed system, such as over a "cloud" 622 via a platform 624 as described below.

Cloud 622 includes and is representative of a platform 624 for resources 626. Platform 624 abstracts underlying functionality of hardware (e.g., servers) and software resources of cloud 622. Resources 626 may include applications, data, or applications and data that can be utilized while computer processing is executed on servers that are remote from computing device 602. Resources 626 can also include services provided over the Internet, through a subscriber network, such as a cellular or Wi-Fi network, or combinations thereof. Resources 626 can include asset store 628, which stores assets, such as videos, ads, audio, multimedia streams, animations, images, web documents, web pages, applications, device applications, text documents, drawings, presentations, user profiles, user preferences, user data, configuration files, and the like, and may be accessed by computing device 602.

Platform 624 may abstract resources and functions to connect computing device 602 with other computing devices. Platform 624 may also serve to abstract scaling of resources to provide a corresponding level of scale to encountered demand for resources 626 that are implemented via platform 624. Accordingly, in an interconnected device embodiment, implementation of functionality described herein may be distributed throughout system 600. For example, the functionality may be implemented in part on computing device 602 as well as via platform 624 that abstracts the functionality of cloud 622.

CONCLUSION

In one or more implementations, a digital medium environment includes a computing device (e.g., a user's mobile device), a digital signage device (e.g., a kiosk at a retail store), and a server. Systems and techniques are described herein for authenticating a user computing device to a digital signage device that are seamless to the user and secure. The computing device is coupled to the digital signage device via a first communication channel, such as according to a low emissions protocol. The digital signage device is coupled to the server via a second communication channel that is encrypted. Security is achieved using a one-time-use token and a resolution provided by the computing device that proves the computing device knows a factorization, known to both the digital signage device and the server, without exposing the factorization in the resolution. The token is communicated from the server to the digital signage device, and is not exposed to the computing device. Thus, the systems and techniques described herein are robust and secure to a man-in-the-middle attack of communication between the computing device and the digital signage device.

Although the invention has been described in language specific to structural features and methodological acts, it is to be understood that the invention defined in the appended claims is not necessarily limited to the specific features or acts described. Rather, the specific features and acts are disclosed as example forms of implementing the claimed invention.

What is claimed is:

1. In a digital medium environment to authenticate a computing device to a digital signage device, a method implemented by the digital signage device, the method comprising:
   receiving an authentication request from the computing device to authenticate the computing device to the digital signage device;
   sending the authentication request to a server;
   receiving a challenge including a random number and a token from the server;
   sending the random number in the challenge to the computing device;

receiving a resolution from the computing device based on the random number and a factorization that includes a first prime factor and a second prime factor, the resolution not disclosing the factorization and proving the factorization is known to the computing device; and
sending the resolution and the token to the server to authenticate the computing device.

2. The method as described in claim 1, wherein the computing device is not directly coupled to the server.

3. The method as described in claim 1, wherein the factorization is known to the computing device and the server.

4. The method as described in claim 1, wherein the resolution is based on the random number and the factorization by raising the first prime factor to the random number and computing a modulo result with the second prime factor.

5. The method as described in claim 1, wherein the sending the random number in the challenge to the computing device includes sending the random number in the challenge without sending the token in the challenge.

6. The method as described in claim 1, wherein the token is a one-time-use token and expires responsive to the one-time-use.

7. The method as described in claim 1, wherein the receiving the request, the sending the random number in the challenge, and the receiving the resolution are communications via a first communication channel, and the sending the request, the receiving the challenge, and sending the resolution are communications via a second communication channel.

8. The method as described in claim 7, wherein the first communication channel is different than the second communication channel, and the communications via the first communication channel are according to a low emissions protocol, and the communications via the second communications channel are encrypted.

9. The method as described in claim 1, wherein the authentication request includes a username associated with the computing device.

10. The method as described in claim 1, wherein the authentication request includes a login request to log into the digital signage device; and
the method further comprising, responsive to the computing device being authenticated, logging in the computing device to the digital signage device and allowing the computing device to control display of information on the digital signage device.

11. The method as described in claim 10, further comprising updating the factorization responsive to the logging in the computing device to the digital signage device.

12. In a digital medium environment to authenticate a computing device, a system comprising:
a request processing module implemented at least partially in hardware of one or more computing devices to:
receive an authentication request from the computing device to authenticate the computing device to a digital signage device; and
send the authentication request to a server;
a challenge processing module implemented at least partially in hardware of the one or more computing devices to:
receive a challenge including a random number and a token from the server; and
send the random number in the challenge to the computing device; and
a resolution processing module implemented at least partially in hardware of the one or more computing devices to:
receive a resolution from the computing device based on the random number and a factorization that includes a first prime factor and a second prime factor, the resolution not disclosing the factorization and proving the factorization is known to the computing device; and
send the resolution and the token to the server to authenticate the computing device.

13. The system as described in claim 12, wherein the resolution is based on the random number and the factorization by raising the first prime factor to the random number and computing a modulo result with the second prime factor.

14. The system as described in claim 12, wherein the challenge processing module is configured to maintain the token without sending the token in the challenge to the computing device.

15. The system as described in claim 12, wherein the token is a one-time-use token and expires responsive to the one-time-use.

16. In a digital medium environment to authenticate a computing device to a digital signage device, a method implemented by the computing device, the method comprising:
a step for sending, by the computing device, an authentication request to authenticate the computing device to the digital signage device;
a step for receiving, by the computing device, a challenge including a random number from the digital signage device;
a step for sending, by the computing device, a resolution to the digital signage device based on the random number and a factorization that includes a first prime factor and a second prime factor, the resolution not disclosing the factorization and proving the factorization is known to the computing device; and
a step for receiving, by the computing device, an acknowledgement that the computing device is authenticated.

17. The method as described in claim 16, further comprising a step for providing to the digital signage device information for display on the digital signage device.

18. The method as described in claim 16, further comprising a step for receiving a query confirming the computing device should authenticate with the digital signage device.

19. The method as described in claim 16, further comprising:
a step for receiving an advertisement based on a username in the authentication request; and
a step for displaying the advertisement on the computing device.

20. The method as described in claim 16, wherein the resolution is further based on a zero knowledge proof of the factorization.

* * * * *